Patented Sept. 14, 1937

2,092,795

UNITED STATES PATENT OFFICE 2,092,795

PROCESS FOR SEPARATING MIXTURES OF CHLOR-PHTHALIC ACID AND ANHYDRIDES

Ernest George Beckett, Cecil Shaw, William Elliot Stephen, George Crowe Semple, and Robert Fraser Thomson, Grangemouth, Scotland, assignors to Imperial Chemical Industries Limited, a corporation of Great Britain No Drawing. Application February 1, 1933, Serial No. 654,760. In Great Britain February 9, 1932

10 Claims. (Cl. 260—123)

This invention relates to the separation of mixtures of phthalic acids and/or their anhydrides having as substituents, one or more halogen atoms or nitro groups substituted in one or more of the 3, 4, 5 and 6 positions.

The substituted phthalic derivatives, especially the chlorophthalic derivatives, are valuable intermediates for the production of dyes and intermediates. Thus, they can be used for the production of anthraquinone derivatives and phthalein derivatives by condensing with benzene or with phenols or other substituted benzenes. The substituted phthalic derivatives have the advantage that, when they are available in pure form, they yield intermediates containing chlorine or other substituents in definite positions, which derivatives may be difficult or impossible to manufacture in other ways.

An object of the present invention is to provide a new and improved method for separating mixtures of halogen or nitro derivatives of phthalic anhydride or acid. A further object is to provide such a method which is more convenient and economical to operate than other methods heretofore employed. Other objects are to advance the art. Still other objects will appear hereinafter.

Briefly, our invention consists in a process for the separation or purification of substituted phthalic acids or anhydrides, particularly chloro- or nitro- substituted compounds, comprising the treatment of mixtures of substituted phthalic anhydrides, in which phthalic acid or anhydride may be present, or the treatment of crude or partly purified substituted phthalic anhydrides, with sulphuric acid of appropriate concentration, whereby one or more of the anhydrides present is converted into the acid and can be separated by known means from the unconverted anhydride or anhydrides.

The separation may be effected, for example, by taking advantage of the solubility of the anhydrides, and the insolubility of the acids, in organic solvents, such as toluene. The sulphuric acid may be the acid used in the preparation of the mixture of derivatives, adjusted, if necessary, to the suitable concentration. The invention also includes a process for the manufacture of 4,5-, 3,4- and 3-6-dichlorophthalic acids or anhydrides which comprises chlorination of phthalic anhydride or acid in a sulphuric acid medium, treating the mixed product, without isolation, with sulphuric acid, by suitable dilution, if necessary, so as to convert the 4,5- dichloro-anhydride into acid, removing the latter, similarly converting next the 3,4-isomer into acid, and separating the 3,4-dichloro-acid from the 3,6-dichloro-anhydride. The invention further includes the modification of the above processes in which the starting material is a mixture of substituted phthalic acids, or of such acids and their anhydrides, including cases where phthalic acid and/or anhydride is present, whereby a conversion of one or more acids into anhydride occurs and a separable mixture of acid or acids and anhydride or anhydrides is obtained as before.

Our invention is based upon our discovery that these phthalic derivatives may be converted from the anhydride into the acid form by heating with sulphuric acid, and, moreover that this conversion or the reverse one occurs at definite concentrations of sulphuric acid which are generally characteristic of the compounds. Thus, in the case of chlorinated phthalic anhydrides, the characteristic concentration of the sulphuric acid appears to be governed by the number of o-chloro substituents present in the molecule. For example, phthalic anhydride, 4-chlorophthalic anhydride and 4,5-dichloro-phthalic anhydride, having no o-chloro substituents, are converted into acid by treating with sulphuric acid of a strength as high as 98–100%. The other chlorinated phthalic anhydrides are not converted into acids by such concentrated sulphuric acid. Again 3-chlorophthalic anhydride and 3,4-dichlorophthalic anhydride having one o-chloro substituent are converted into acid by sulphuric acids having a strength of less than 95%. On the other hand, those chlorinated phthalic anhydrides, which contain o-chloro substituents in both positions, such as 3,6-dichlorophthalic anhydride and tetrachlorophthalic anhydride, are converted into acid only by treatment with sulphuric acid weaker than 50%.

In other words, we have discovered that when phthalic anhydride, 4-chloro-phthalic anhydride or 4,5-dichloro-phthalic anhydride are treated with sulphuric acid of any strength up to 100%, the anhydrides are converted to the corresponding acids. Also, that, when 3-chloro, 3,4-dichloro, 3,5-dichloro, or 3,4,5-trichloro-phthalic anhydrides are treated with sulphuric acid in any strength, up to 95%, such anhydrides will be converted to the corresponding acids but, if higher strengths of sulphuric acid are employed such conversion will not take place. On the other hand, sulphuric acid of 95% strength or greater will convert the 3-chloro acids to anhydrides. Further, we have discovered that, when 3,6-dichloro, 3,4,6-tri-chloro, 3,4,5,6-tetrachlorophthalic anhydrides are treated with sulphuric acid in any strength up to 50%, these phthalic anhydrides will be converted to the corresponding acids but will not be converted to acids if sulphuric acid of greater strength than 50% is employed. However, sulphuric acid of strength greater than 50% will convert 3,6-chloro acids to anhydrides.

As is well known, phthalic anhydride has the following formula:

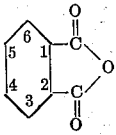

It will be understood that when we refer, in the specification and claims, to ortho substituted phthalic compounds, we mean thereby compounds substituted in the positions ortho to the $$-\overset{O}{\underset{\parallel}{C}}-$$

group. In other words, in the 3 or 6, or both the 3 and 6 positions.

Sulphuric acid can also be used for converting the acids into anhydrides in the same way. For example, if a mixture of phthalic acid and 3,4-dichlorophthalic acid be treated with 95% sulphuric acid only the 3,4-dichlorophthalic acid is converted into anhydride.

We have found that these methods of converting the acid into the anhydride, or vice versa, can be utilized in the production and separation of phthalic derivatives, for example, in the separation of mixtures containing two or more phthalic derivatives, such as the mixtures of isomeric dichlorophthalic derivatives obtained in the chlorination of phthalic anhydride. As the anhydrides are soluble in solvents such as toluene in which the acids are comparatively insoluble this action of sulphuric acid provides a simple method of separating chlorinated phthalic anhydrides into three groups: those which contain no o-chloro substituent, those which contain one o-chloro substituent and those which contain two o-chloro substituents.

Further, it is not always necessary that the anhydride itself be acted on by the sulphuric acid. Solutions of the anhydride can also be used. Thus if a solution of 3,4-dichloro-, and 3,6-dichlorophthalic anhydrides and tetrachlorophthalic anhydride be shaken in toluene at 90–95° C. with 56% sulphuric acid, the 3,4-dichlorophthalic anhydride alone is converted into acid, which, being insoluble both in the toluene and the sulphuric acid, is precipitated pure in the solid form.

The following examples, in which parts are by weight, illustrate, but do not limit, our invention.

*Example 1*

100 parts of a mixture of approximately equal quantities of 3,6- and 4,5-dichlorophthalic anhydrides, are dissolved in 500 parts of 98% sulphuric acid, by stirring at 100° C. for about 1 hour. At the end of this time, and after cooling, if desired, the melt is poured on to 1000 parts of ice, and the resultant precipitate filtered off.

The precipitate consists substantially of a mixture of 3,6-dichlorophthalic anhydride and 4,5-dichlorophthalic acid.

This mixture can be separated into its components if desired, a convenient method being extraction with toluene, in which the 3,6-dichlorophthalic anhydride is soluble, while the 4,5-dichlorophthalic acid is substantially insoluble.

400 parts of toluene and a temperature of 80° C. may conveniently be used for the extraction.

*Example 2*

100 parts of a mixture of 3,6- and 3,4-dichlorophthalic anhydrides containing about 50 parts of the former, are dissolved in 950 parts of 98% sulphuric acid. 500 parts of water are then added to the solution with cooling, and good stirring, after which, the temperature is raised to 100° C., and kept at this for two hours. The whole is then cooled and poured on to 2000 parts of ice, when a mixture of 3,6-dichloro-phthalic anhydride and 3,4-dichlorophthalic acid is obtained which can be further separated, if desired.

*Example 3*

In this example, a mixture of 3,4-, 4,5-, and 3,6-dichlorophthalic anhydrides, is used as starting material. This mixture is obtained by chlorinating phthalic anhydride dissolved in oleum, and consists of a mixture of the three mentioned isomers in the order named, in the approximate proportions of 30:10:60.

100 parts of the mixture of the three isomers are dissolved in about 500 parts of a mixture of oleum and chlorosulphonic acid. This is diluted with sufficient water to give a solution of the anhydrides in 98–99% sulphuric acid. While the water is being added, the solution is kept well stirred and cooled, and is afterwards warmed to about 50° C. for one hour, then cooled again, and poured onto 1000 parts of ice. The resulting precipitate contains the 4,5-dichloro-isomer in the acid form, the other two isomers being present as anhydrides.

*Example 4*

The solution, obtained by passing 38 parts of chlorine at 60° C. through a solution of 40 parts of phthalic anhydride dissolved in 200 parts of 20% oleum plus 28 parts of 65% oleum and containing a little iodine, is diluted by the addition of 12 parts of water. It is allowed to stand for an hour and then slowly poured on to 600 parts of ice. The precipitate, which consists of 3,6 - dichlorophthalic anhydride, 3,4 - dichlorophthalic anhydride, and 4,5-dichlorophthalic acid in the approximate proportions of 50:30:10, is filtered off and treated with 350 parts of cold toluene and filtered. The toluene solution, which contains practically all the 3,6- and 3,4- isomers and none of the 4,5-, is shaken up thoroughly with half its bulk of 56% sulphuric acid at 95° C. for 3 hours. After cooling, the precipitated 3,4-dichlorophthalic acid is filtered off, washed with toluene and is then free from other isomers. The 3,6- dichloro-phthalic anhydride can be obtained in a pure form by concentrating the toluene liquors and allowing it to be crystallized out.

The nitro derivatives like the chloro derivatives show conversion at definite concentrations, but the concentrations for different conversions are closer and separation accordingly less easy.

This conversion of anhydrides into acids by the removal of water from a strong dehydrating agent such as concentrated sulphuric acid, especially sulphuric acid of 98–100% must be regarded as surprising.

The process according to the present invention provides a very convenient and economical method for the separation of substituted phthalic anhydrides, and renders some of them readily available as intermediates for the first time.

In speaking of separation, we include also purification where one derivative has to be separated from relatively small proportions of one or more others.

While we have disclosed certain methods treating certain mixtures of specific compounds under certain definite conditions it will be readily understood that many variations can be made in the ingredients, mixtures and conditions employed without departing from the spirit of our invention. Accordingly, the scope of our invention is to be limited solely by the appended claims, construed as broadly as is permissible in view of the prior art.

We claim:

1. A process for separating mixtures of phthalic anhydrides only part of which contain as a substituent chlorine in a position ortho to a

group which process comprises treating the mixture with sulphuric acid of about 98% to 100% strength.

2. A process for separating mixtures of phthalic anhydrides only part of which contain as a substituent chlorine in a position ortho to a

group which process comprises treating the mixture with sulphuric acid of about 98% to 100% strength, separating the resulting mixture of phthalic anhydrides and phthalic acids from the sulphuric acid and then separating the phthalic acids from the anhydrides.

3. A process for separating mixtures of phthalic anhydrides comprising at least one phthalic anhydride unsubstituted in the positions ortho to the

groups, at least one phthalic anhydride substituted in only one position ortho to the

groups by a chlorine atom, and at least one phthalic anhydride substituted in both positions ortho to the

groups by chlorine atoms, which comprises treating the mixture with sulphuric acid of about 98 to 100% strength, separating the phthalic anhydrides from the phthalic acids in the resulting mixture and then treating the phthalic anhydrides with sulphuric acid of a strength greater than 50% and less than 95%.

4. A process for separating mixtures of phthalic anhydrides only part of which are substituted in both positions ortho to the

groups by chlorine atoms and part of which are unsubstituted in the positions ortho to the

groups which process comprises treating the mixture with sulphuric acid of a strength greater than 50% and less than 100%.

5. A process for separating mixtures of phthalic anhydrides comprising at least one phthalic anhydride substituted in only one position ortho to the

groups by a chlorine atom and at least one phthalic anhydride substituted in both positions ortho to the

groups by chlorine atoms which process comprises treating the mixture with sulphuric acid of a strength greater than 50% and less than 95%.

6. A process for separating mixtures of phthalic acids only part of which contain chlorine atoms in both positions ortho to the

groups, which process comprises treating the mixture with sulphuric acid of 50% to 95% strength, and then separating the phthalic acids from the phthalic anhydrides.

7. A process for separating mixtures of phthalic acids only part of which contain chlorine atoms in both positions ortho to the

groups and part of which are unsubstituted in the positions ortho to the

groups, which process comprises treating the mixture with sulphuric acid of 50% to 100% strength, and then separating the phthalic acids from the phthalic anhydrides.

8. A process for separating mixtures of phthalic acids comprising at least one phthalic acid unsubstituted in the positions ortho to the

groups, at least one phthalic acid substituted in only one position ortho to the

group by a chlorine atom, and at least one phthalic acid substituted in both positions ortho to the

groups by chlorine atoms, which process comprises treating the mixture with sulphuric acid of a strength greater than 50% and less than 95%, separating phthalic anhydrides from the remaining phthalic acids, then treating the remaining phthalic acids with sulphuric acid of 95% to 100%, and separating phthalic anhydrides from the resulting mixture.

9. A process for separating mixtures of phthalic acids only part of which contain as a substituent a chlorine atom in a position ortho to the

groups, which process comprises treating the mixture with sulphuric acid of 95% to 100% strength, and then separating the phthalic acids from the phthalic anhydrides.

10. A process for separating mixtures of phthalic acids comprising at least one phthalic acid substituted in only one position ortho to the

groups by a chlorine atom and at least one phthalic acid substituted in both positions ortho to the

groups by chlorine atoms, which process comprises treating the mixture with sulphuric acid of a strength greater than 50% and less than 95%, and then separating phthalic anhydrides from the unconverted acids.

ERNEST G. BECKETT.
CECIL SHAW.
WILLIAM ELLIOT STEPHEN.
GEORGE CROWE SEMPLE.
ROBERT FRASER THOMSON.